United States Patent [19]

Qualtrough et al.

[11] 3,897,576
[45] July 29, 1975

[54] PRODUCTION OF SHEET MATERIAL FOR USE AS GASKETS

[75] Inventors: John Geoffrey Qualtrough, Bolton; Harry Thornley, Rochdale, both of England

[73] Assignee: TBA Industrial Products Limited, Manchester, England

[22] Filed: Aug. 31, 1973

[21] Appl. No.: 393,774

Related U.S. Application Data

[63] Continuation of Ser. No. 185,516, Oct. 1, 1971, abandoned.

[30] Foreign Application Priority Data

Sept. 21, 1970 United Kingdom............... 44903/70

[52] U.S. Cl. ................ 427/174; 427/194; 427/195; 427/208; 427/211; 427/388
[51] Int. Cl.² ........................................ B29C 17/02
[58] Field of Search.......... 117/132 CB, 132 R, 133, 117/2, 68, 75, 111 H

[56] References Cited
UNITED STATES PATENTS

| | | | |
|---|---|---|---|
| 2,957,784 | 10/1960 | Schiefelbein.......................... | 117/75 |
| 3,013,926 | 12/1961 | Railsback et al. ............ | 117/132 CB |
| 3,132,040 | 5/1964 | Charles-Messance ................ | 117/68 |
| 3,159,516 | 12/1964 | Harris................................. | 156/292 |
| 3,264,132 | 8/1966 | Merrill et al. .................... | 117/111 R |
| 3,400,009 | 9/1968 | McDermott et al. .......... | 117/132 CB |
| 3,429,727 | 2/1969 | Hochberg ............................ | 117/68 |
| 3,453,164 | 7/1969 | Gursky et al. ........................ | 117/68 |
| 3,537,915 | 11/1970 | Becker........................... | 117/132 CB |

*Primary Examiner*—William R. Trenor
*Attorney, Agent, or Firm*—Brisebois & Kruger

[57] ABSTRACT

A process for producing in indefinitely long lengths a composite sheet for use as a gasket material, the sheet comprising surface coatings of fibre reinforced elastomer bonded to both faces of a metal core, is characterised by simultaneously forming a curable dough-like fibre reinforced elastomer composition into a sheet and applying the sheet to one face of the metal core of indefinite length in a single continuous operation. This is done by feeding the metal core and, on one face of the metal core the dough-like composition, which contains fibre, elastomer, curatives, fillers an a solvent system including a volatile solvent for the elastomer and a non-solvent liquid through a nip between two calender rolls to spread the elastomer composition over the metal core and apply it thereto to form one coating, subsequently passing the coated metal core to a drying device to remove the solvent system from the composition, passing the dry, but uncured, coated metal core together with further dough-like composition on the other face of the core through a second nip between the two calender rolls to spread the composition over the other face of the core and apply it thereto to form a second coating. The non-solvent liquid prevents adhesion of the composition to the rolls. After this the core with its second coating is passed to a drying device to remove the solvent system from the second coating, the core with its coatings is passed through a further nip between two calender rolls to consolidate the coatings and enhance the bond between the coatings and the core and finally the coated core is passed into an oven to cure the composition. When the metal core is a plain metal sheet as is preferred, the core is coated with an adhesive before the dough-like composition is applied to it and the adhesive is partly soluble in the solvent system.

12 Claims, 2 Drawing Figures

PRODUCTION OF SHEET MATERIAL FOR USE AS GASKETS

This is a continuation of application Ser. No. 185,516, filed Oct. 1, 1971, now abandoned.

A composite sheet material commonly used for making gaskets in, for example, the cylinder heads of internal combustion engines comprises surface coatings of fibre reinforced elastomer bonded to both faces of a metal core. In one conventional method of making such materials the coatings are formed separately and are subsequently bonded to the metal core in a separate operation.

Very considerable advantages would be obtained if the conventional fibre reinforced elastomer could be formed into a sheet and be bonded to a strip of the metal core of an indefinitely long length by a continuous process.

The aim of the present invention is to provide such a continuous process which has hereto been found to be impossible with the particular materials involved, namely a metal core and fibre reinforced elastomeric coatings.

According to the present invention, such a composite sheet is produced in indefinitely long lengths by simultaneously forming a curable dough-like fibre reinforced elastomer composition into a sheet and applying the sheet to one face of the metal core of indefinite length by feeding the metal core and, on one face of the metal core, a dough-like composition containing fibre, elastomer, curatives, fillers and a solvent system including a volatile solvent for the elastomer and a non-solvent liquid through a nip between two calender rolls to spread the elastomer composition over the metal core and apply it thereto to form one coating, the non-solvent liquid preventing adhesion of the composition to the rolls, passing the coated metal core to a drying device to remove the solvent system from the composition, passing the dry, but uncured, coated metal core together with further dough-like composition on the other face of the core through a second nip between two calender rolls to spread the composition over the other face of the core and apply it thereto to form a second coating, passing the core with its second coating to a drying device to remove the solvent system from the second coating, passing the core with its coatings through a further nip between two calender rolls to consolidate the coatings and enhance the bonding of the coatings to the core, and then passing the coated core into an oven to cure the composition.

The volatile solvent is required in the solvent system to render the composition plastic so that it can be spread by the calender rolls as an even coating over the surface of the metal core.

Preferably the fibre in the composition is asbestos, the volatile solvent is a liquid hydrocarbon, for example toluene, and the non-solvent liquid is water. When the volatile solvent is toluene and the non-solvent liquid is water, the ratio of toluene to water in the solvent system is preferably greater than 4 to 1 and less than 10 to 1 by volume.

The metal core may be of woven wire gauze or expanded metal and in this case the dough-like composition will bond readily to the core by direct contact as some of the composition penetrates the interstices of the gauze or expanded metal. Similar considerations apply if the metal core is a perforated sheet. Preferably, however, the metal core is a plain or an embossed sheet and in this case, to assist in bonding the dough-like composition to the metal core, the core is preferably coated with an adhesive before the dough-like composition is applied to it. When an adhesive is used, its nature is of importance and it preferably comprises a curable adhesive material in solution in a solvent and when it has been applied to the metal, the solvent is evaporated to leave a thin film of at least 5 microns thick of flexible heat-curable adhesive on both sides of the metal core. Subsequently when the dough-like composition and the core are fed through the nip between two calender rolls, the composition comes into contact with the uncured adhesive. If the adhesive were easily soluble in the solvent system in the dough-like composition, that is to say in the mixture of solvent and non-solvent liquids, the coating of composition applied to the metal core during the passage between the calender rolls would tend to slip because the dissolved adhesive would tend to act as a lubricant. To avoid this, the adhesive is preferably only partly soluble in the solvent system in the composition. The result is that the adhesive is not dissolved to act as a lubricant, but nevertheless the solvent in the dough takes some adhesive into solution and so causes surface fusion of the adhesive and the curable elastomeric constituent of the dough. This ensures that there is an effective bond between the coatings of fibre reinforced elastomer and the metal core after the elastomeric composition and the adhesive have been cured. The partial solubility of the adhesive in the solvent system of the dough-like composition provides the metal core with a tacky surface to which the composition adheres preferentially. The presence of water or other non-solvent liquid as the second component of the solvent system prevents the composition adhering to the calender rolls and thus allows the formation of a smooth surfaced coating.

Preferably the adhesive is a solution of nitrile rubber and a phenolic resin, which is readily soluble in a polar solvent such as ethyl acetate, but which is only partly soluble in toluene. The use of the phenolic resin presents the advantage that it will adhere to the metal, but by itself is brittle. This brittleness is largely removed by the mixture with it of the nitrile rubber.

When the dough-like composition and the dried adhesive film are pressed together on passage through the calender rolls, the toluene in the composition makes the adhesive surface tacky. The toluene and water are subsequently evaporated and then the curable dough-like composition is bonded to the adhesive which in turn is bonded to the metal. The subsequent consolidation of the coatings of fibre-reinforced composition ensures that there is a very strong bond and prevents subsequent delamination of the composite sheet material during handling and service.

When toluene and water form the solvent system, the adhesive is soluble to different extents in the solvent system in accordance with the ratio of toluene to water in it. The limits of the ratio of toluene to water already set out, within which efficient release of the coating of dough-like composition from the calender roll is obtained, have been found satisfactory with respect to the solubility of the adhesive in the solvent system.

When an adhesive is used between the metal core and the coatings, it is not necessary to apply the adhesive to both faces of the core before applying the coating to one face, although this is convenient. The adhesive may be applied to the second face after the coating on the first face has been dried by evaporation of the solvent system from it.

An example of a process in accordance with the invention will now be described with reference to the accompanying diagrammatic drawings, in which.

Figure 1:
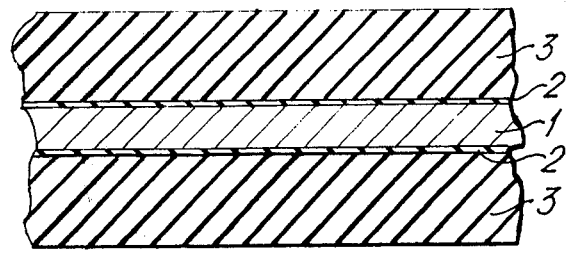
FIG. 1 is a section through a small piece of the composite sheet.

As shown in FIG. 1, the composite sheet comprises a metal core 1 having on each side a coating comprising a film of adhesive 2 and a layer of cured fibre reinforced elastomer 3.

Figure 2:
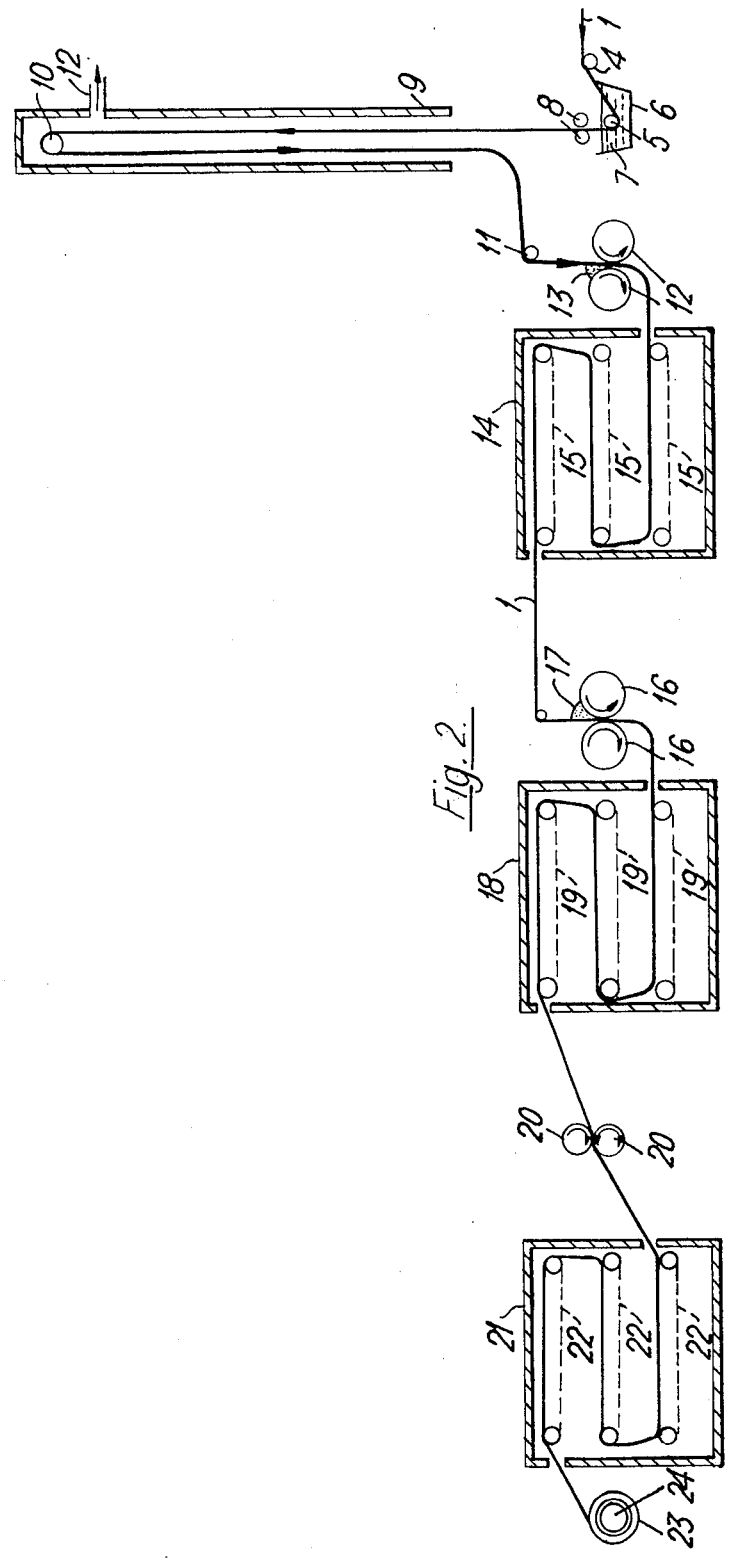
FIG. 2 is a diagrammatic illustration of one example of the apparatus used in carrying out the process.

The composite sheet is made as follows in the apparatus illustrated diagrammatically in FIG. 2:

An indefinitely long strip of the metal core 1 which in this example is plain tin plate steel is drawn from a roll and extends over a guide roller 4 and under a guide roller 5 in a tank 6 holding a bath of liquid adhesive 7. From the tank 6, the core 1 passes upwards between a pair of fixed metering bars 8 which determine the thickness of the film of adhesive applied to the two sides of the core 1 and thence the core 1 with the adhesive films on its two sides passes upwards through a heated adhesive solvent extraction tower 9. The core 1 with its adhesive films passes over a guide roller 10 at the top of the tower 9 and thence downwards again and over a guide roller 11. In its passage through the tower, solvent in the adhesive is evaporated and passes through an outlet 12 from the tower to a solvent recovery system.

Next the core 1 with the adhesive films on both sides passes through the nip between a pair of calender rolls 12 which are positively rotated. A mass of dough-like fibre reinforced elastomer composition 13 in pellet form containing a curing system, filler and a solvent system consisting of toluene and water is maintained at the nip formed between one of the calender rolls 12 and the core 1. The dough-like composition may be supplied manually with a shovel to the nip or it may be metered from a hopper, but the exact rate of supply is not important provided a head of the composition is maintained between the calender roll and the core 1. As the core 1 passes between the calender rolls 12, the composition 13 is formed into a sheet and the sheet is bonded onto one face of the core 1 at the same time. The sheet of dough-like composition is prevented from sticking to the calender roll 12 with which it comes into contact by the presence of the water in the solvent system. The thickness of the sheet of dough-like composition applied to the core 1 is determined by the distance between the rolls 12 in relation to the thickness of the core 1.

After leaving the nip between the calender rolls 12, the core 1 with its coatings of adhesive and coating of dough-like composition on one face is passed into a drying oven 14 through which it is conveyed by a series of endless conveyor belts 15. Thence the core 1 with the coating of dough-like composition from which the solvent system has been evaporated by the drying oven 14, passes downwards through the nip between a further pair of calender rolls 16. One of the calender rolls comes into contact with the dried composition coating on one side of the core 1 and further composition 17 of a similar nature to the composition 13 is simultaneously formed into a sheet and is bonded to the other side of the core 1.

The core with its two coatings of dough-like composition is next passed through a second drying oven 18 similar to the drying oven 14 and having a series of endless conveyor belts 19.

The next step in the process is for the core 1 with its two coatings of dough-like composition, both of which are now dried but not cured, to be passed between a third pair of calender rolls 20 the distance between which is slightly less than the overall thickness of the core 1 and its coatings so that both coatings are consolidated and the bonding of the coatings to the core 1 is enhanced.

Finally, the core 1 with its consolidated coatings passes through a third oven 21 with a series of endless conveyor belts 22 and this oven, being heated to a higher temperature than the drying ovens 14 and 18 cures the composition to form the final composite sheet material which is then formed into a coil 23 on a coiling mandrel 24.

In an example, the materials used in the process in the apparatus as just described are as follows:

Firstly, to prepare the dough-like composition 13 and 17, rubber, accelerators and curing agents are mixed in a Banbury mixer to form a rubber compound. The rubber compound is steeped for 16 hours at room temperature in toluene and is then homogenised in a twin sigma blade mixer to form a rubber dough. The rubber dough, asbestos fibre and filler are then mixed together in a mixer to form the fibre reinforced dough-like composition. Towards the end of the mixing cycle, the non-solvent liquid, which is a solution of soda ash in water, is added to the mix. The mix is finally extruded and pelletised through a conventional mincing machine. The following formulation is a typical example expressed in parts per 100 parts by weight of asbestos fibre:

| Rubber Compound | |
|---|---|
| Styrene Butadiene Rubber (S.B.R. 1509) | 25.000 |
| Zinc Oxide | 1.250 |
| H.A.F. Carbon Black | 10.000 |
| Stearic Acid | 0.125 |
| Tetramethylthiuram disulphide | 0.500 |
| N-cyclohexyl benzthiazole - 2 - sulphenamide | 0.250 |
| Sulphur | 0.125 |
| Total Rubber compound | 37.250 |
| Rubber Dough | |
| Rubber compound | 37.250 |
| Toluene | 71.920 |
| Total Rubber dough | 109.170 |
| Fibre Reinforced Composition | |
| Rubber dough | 109.170 |
| Asbestos Fibre | 100.000 |
| Barytes | 28.583 |
| Sodium Carbonate | 0.833 |
| Water | 10.000 |

In this example the metal core is plain tin plate steel 0.006 inches thick and 18 inches wide and an adhesive coating is used. The adhesive is a nitrile rubber/modified phenolic resin adhesive known by the Trade Name National Adhesive 136–6318. The adhesive is diluted 1:1 with ethyl acetate, a volatile solvent, to give a concentration of 13 percent by weight of solids.

The metering bars are set to give a dry adhesive film thickness of 5 microns and the metal core is passed through the apparatus at a speed of 20 feet per minute, which is also the surface speed of the calender rolls all of which are 30 inches in diameter. The gap between the rolls 12 is 0.018 inches; that between the rolls 16 is 0.034 inches and that between the rolls 20 is 0.030 inches. The effective length of each of the ovens 14, 18 and 21 is such that the dwell time of the coated core within the oven is 3 minutes, the ovens 14 and 18 operating at a temperature of 110°C and the oven 21 operating at a temperature of 150°C.

The purpose of the curing oven 21 is to convert the elastomeric material in the dough-like composition from a plastic material which will flow under pressure to an elastic material which is resistant to flow. It is only when the elastomeric binder is in the cross-linked state that the desired properties of the finished material are obtained.

We claim:

1. A process for producing in indefinitely long lengths a composite sheet constituted by surface coatings of fibre-reinforced elastomer bonded to both faces of a metal core, said process comprising the steps of compounding a curable dough from fibre, elastomer, curatives, fillers and a solvent system including a volatile solvent for the elastomer and a liquid which is a non-solvent for said elastomer, pelletizing said curable dough, coating both faces of the metal core with an adhesive which is slightly soluble in the volatile solvent and then feeding said pelletized dough and metal core through a nip between two calender rolls with said dough contacting only one adhesive coated face of said core while said volatile solvent coacts with said adhesive to cause preferential adhesion of said dough to said one adhesive-coated face of the metal core to form a coating thereon and said non-solvent liquid prevents adhesion of said dough to said rolls, passing the thus coated metal core to a drying device to remove the solvent system from the coating, passing the dry, but uncured, coated metal core together with further curable dough on the uncoated side thereof through a nip between two further calender rolls to spread said further curable dough over the other adhesive coated surface of the metal core to form a second coating thereon, passing the coated metal core to a drying device to remove the solvent system from said second coating, passing the coated metal core through a further nip between two calender rolls to consolidate the coatings and enhance the bond between the coatings and the core, then passing the coated metal core into an oven to cure the elastomer.

2. A process according to claim 1, in which the fibre is asbestos.

3. A process according to claim 1, in which the volatile solvent is a liquid hydrocarbon.

4. A process according to claim 3, in which the hydrocarbon is toluene.

5. A process according to claim 4, in which the non-solvent liquid is water.

6. A process according to claim 5, in which the ratio of toluene to water in the solvent system is greater than 4 to 1 and less than 10 to 1 by volume.

7. A process according to preceding claim 1, in which the metal core is a plain sheet.

8. A process according to claim 1, in which the metal core is a perforated sheet.

9. A process according to claim 1, in which the metal core is an embossed sheet.

10. A process according to claim 1, in which the metal core is of woven wire gauze or expanded metal.

11. A process according to claim 1, in which the adhesive is a mixture of nitrile rubber and a phenolic resin.

12. A process according to claim 1, in which the adhesive is in a film at least 5 microns thick.

* * * * *